US011323522B2

(12) United States Patent
Ruge

(10) Patent No.: US 11,323,522 B2
(45) Date of Patent: *May 3, 2022

(54) SECURE, ANONYMOUS BROWSING WITH A REMOTE BROWSING SERVER

(71) Applicant: Colorado Code Craft Patent Holdco, LLC, Loveland, CO (US)

(72) Inventor: Thomas Ruge, Denver, CO (US)

(73) Assignee: Colorado CodeCraft, Ltd, Denver, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 16/518,885

(22) Filed: Jul. 22, 2019

(65) Prior Publication Data

US 2020/0059524 A1 Feb. 20, 2020

Related U.S. Application Data

(63) Continuation of application No. 15/264,738, filed on Sep. 14, 2016, now Pat. No. 10,404,808.

(51) Int. Cl.
*H04L 29/08* (2006.01)
*H04L 67/146* (2022.01)
*H04L 67/02* (2022.01)
*H04L 67/60* (2022.01)
*G06F 9/451* (2018.01)
*H04L 29/06* (2006.01)

(52) U.S. Cl.
CPC .......... *H04L 67/146* (2013.01); *G06F 9/452* (2018.02); *H04L 63/0421* (2013.01); *H04L 63/083* (2013.01); *H04L 67/02* (2013.01); *H04L 67/32* (2013.01)

(58) Field of Classification Search
CPC . H04L 67/146; H04L 63/083; H04L 63/0421; H04L 67/02; H04L 67/32; G06F 9/452
See application file for complete search history.

(56) References Cited

U.S. PATENT DOCUMENTS

| 2014/0012898 A1* | 1/2014 | Mittal | G06F 16/957 709/203 |
| 2015/0156069 A1* | 6/2015 | Wu | H04L 67/02 709/221 |
| 2015/0339213 A1* | 11/2015 | Lee | G06F 3/0484 717/125 |

* cited by examiner

*Primary Examiner* — Michael A Keller
*Assistant Examiner* — Jsing Forng Lin
(74) *Attorney, Agent, or Firm* — Krajec Patent Offices, LLC; Russell Krajec

(57) ABSTRACT

A client device may connect to a remote browsing server, which may browse to a Uniform Resource Identifier, render a web service or other content, and stream the content back to the client device. The client device may have a web browser through which the server may stream rendered images and which may capture various inputs, such as mouse operations, keyboard inputs, and other input. The remote browsing server may receive the inputs from the browser, then transmit the inputs to the web service through a server browser, which may render the images transmitted to the client device. The remote browsing server may be a virtual machine that may be created for a limited use, such that the virtual machine and browser may be wiped clean with each use.

20 Claims, 9 Drawing Sheets

SECURE, ANONYMOUS BROWSING WITH A REMOTE BROWSING SERVER

CROSS REFERENCE TO RELATED APPLICATIONS

This application claims priority to and benefit of U.S. Provisional Patent Application Ser. No. 62/218,273 entitled "Secure Web Browsing Systems and Methods" filed 14 Sep. 2015 by Thomas Ruge, and U.S. patent application Ser. No. 15/264,738 entitled "Secure, Anonymous Browsing with a Remote Browsing Server" filed 14 Sep. 2016 by Thomas Ruge, the entire contents of which are hereby incorporated by reference for all they disclose and teach.

BACKGROUND

Hyper Text Markup Language (HTML) is one of the most widely used protocols for delivering content and services on the Internet. Uniform Resource Identifiers (URI) are commonly used to access web pages, services, and other online resources.

Internet browsing is fraught with security issues. Malware may be embedded in web pages and downloaded to a client device, cookies and other tracking mechanisms may store information about a user, and a user's device may unwittingly provide identifying information about the user in the form of IP addresses, MAC addresses, and the like.

SUMMARY

A client device may connect to a remote browsing server, which may browse to a Uniform Resource Identifier, render a web service or other content, and stream the content back to the client device. The client device may have a web browser through which the server may stream rendered images and which may capture various inputs, such as mouse operations, keyboard inputs, and other input. The remote browsing server may receive the inputs from the browser, then transmit the inputs to the web service through a server browser, which may render the images transmitted to the client device. The remote browsing server may be a virtual machine that may be created for a limited use, such that the virtual machine and browser may be wiped clean with each use.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
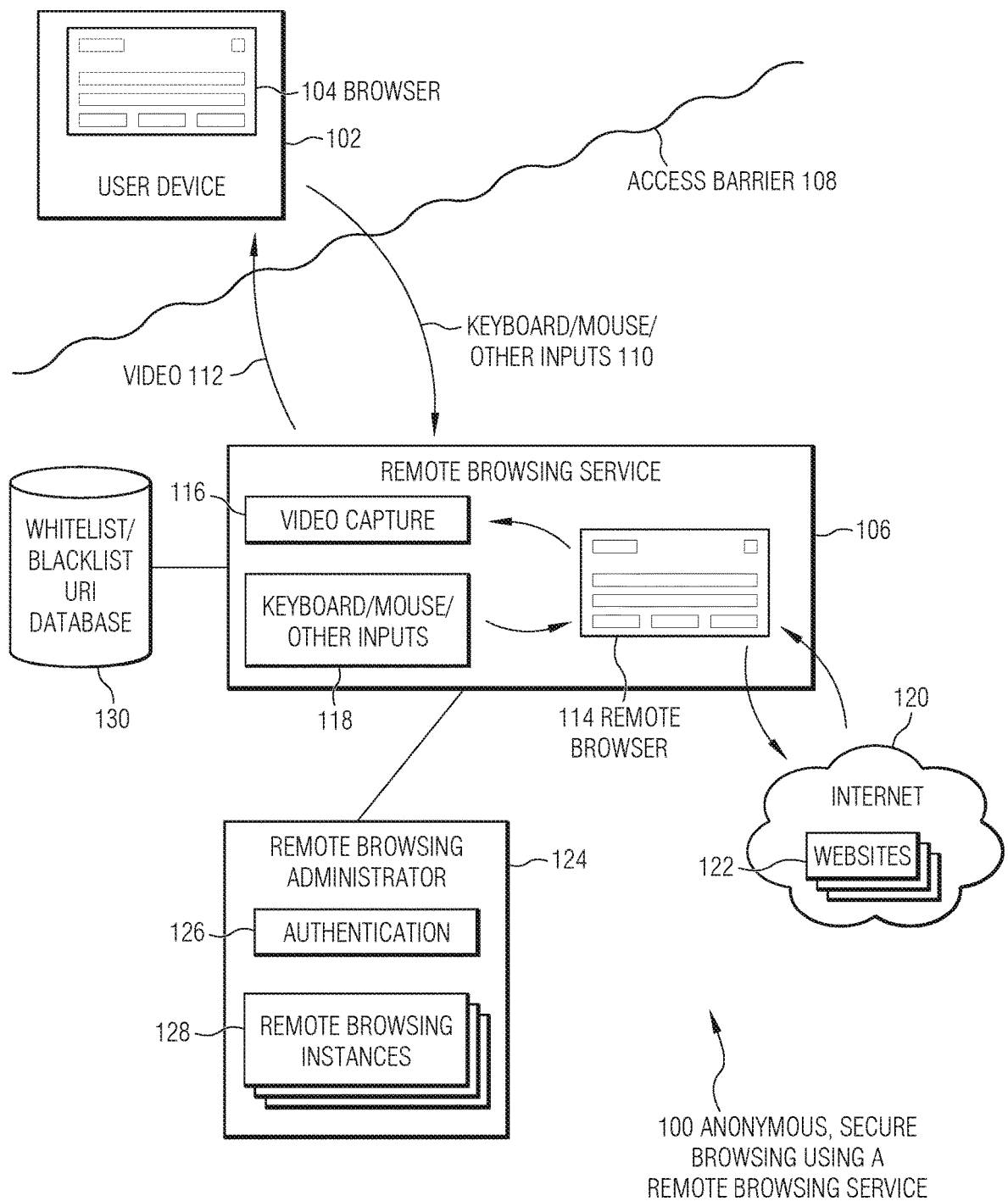
FIG. 1 is a diagram illustration of an embodiment showing anonymous, secure browsing using a remote browsing service.

Secure, Anonymous Browsing with a Remote Browsing Server

A remote browsing service may use a remote browsing server to access content on the Internet or other network. The remote browsing server may access and render content, which may be streamed back to a user's client device. The remote browsing server may provide a buffer between the Internet and the user's client device, such that malware, cookies, tracking software, and other malicious or merely annoying features of today's Internet may not infect the client device nor will tracking information about the user be obtainable by websites being browsed.

The remote browser server may have a browser which may connect to a Uniform Resource Indicator (URI), Uniform Resource Locator (URL), or other browser-accessible content. In a typical use case, the remote browser server may receive and render the content from a website.

The remote browser server may then capture the rendered website images and transmit the images to a browser on a client device. The client browser may display the website image to a user and may capture mouse, keyboard, and other inputs, which may be transmitted to the remote browser server. The remote browser server may transmit those inputs through its browser to the website.

The remote browser server may customize the browsing experience for the user. One way to customize the browsing experience may be to anonymize the browsing experience. The remote browser server may be a virtual machine that may be instantiated just for the browsing session and may have no identifiable information. Such a configuration may have an Internet Protocol (IP) address, Media Access Control (MAC) address, or other identifiers that may be allocated just for the browsing session, thereby prohibiting websites from identifying the user from those identifiers.

Cookies and other tracking information commonly placed in a browser cache may also be wiped clean with each new browsing session. In many cases, cookies and other data may be stored by websites. These data may be used to track a user's behavior with the website. In a typical use case, a website may detect that a visitor has visited the website before and might present one version of a webpage. When no cookie is present, the website may present a webpage for a first time visitor.

A user who may occasionally surf the Internet may gather hundreds or thousands of cookies, each of which may be accessible by any tracking software embedded in various websites without the user's knowledge. In many cases, the tracking cookies may be used by websites to identify specific users.

Cached data on a browser, which may include cookies, bookmarks, and other tracking information, may be used to piece together a user's browsing history across many different websites. Such information may be compiled into detailed dossiers about a person's likes, dislikes, political affinity, religious beliefs, deviant habits, and many other factors. By starting with a clean browser with each browsing session, the system may thwart advertiser's efforts to track user behavior.

In an enterprise environment, their employee's browsing history may reveal competitive information. For example, employees may do a considerable amount of Internet research prior to entering a new field of launching a new product. Such research may involve visiting competitor's websites. The employee's browsing history may be sensitive competitive information that the company may want to hide or anonymize.

Malicious software ("malware") of all sorts may be downloaded inadvertently from many websites. Because the client device accesses the remote browsing server through a communication link, any malware may infect the remote browsing server without infecting the client device. Further, since the remote browsing server may be a virtual machine instance, the remote browsing server may be destroyed after each session, thereby minimizing any adverse effects of the malware.

The remote browsing service may permit different levels of security to be applied to different websites. For some websites, a user may browse securely and anonymously by using a fresh and pristine remote browsing instance. Such a system may access a browser through an access barrier provided by the video link to the remote browser, such that malware, cookies, and other executable and data items stored by a website are not preserved. The anonymous aspect may be provided by having different Internet Protocol (IP) and Media Access Control (MAC) addresses for each browsing session.

Browsing may be made secure but not anonymous by using a remote browsing system on a separate system, and by preserving cookies, bookmarks, and other data. These data may be preserved from one session to the next, and may be reloaded to a new browser when a new, fresh browser session may be started. A user may select such a configuration when a user may access a website often, especially one where the user may have an account. Such websites may place cookies on a browser to help identify and authenticate the user, store the user's prior activity, or provide some features that improve the user experience on the website. Such a configuration may still prevent malware and other infections to reach the user's client device.

Direct browsing may be provided in cases where a user may browse to websites and services that are known to the user. For example, a user in a large company may access certain company resources, such as a Customer Resource Manager application, accounting application, or other enterprise application. Rather than accessing those applications from a remote browser, a direct connection from the user's browser may be established to the website.

A white list/black list or other mechanism may be used to identify which websites may be suitable for direct browsing and which may be appropriate for anonymous or secure browsing. Such a mechanism may operate on the user's device, on a remote browsing service, on a proxy device, or some other mechanism. As a user browses to a Uniform Resource Identifier, the mechanism may direct the user's browser to a remote browsing service for unknown or dangerous websites, while permitting direct connection to a website that may be previously authorized.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

In the specification and claims, references to "a processor" include multiple processors. In some cases, a process that may be performed by "a processor" may be actually performed by multiple processors on the same device or on different devices. For the purposes of this specification and claims, any reference to "a processor" shall include multiple processors, which may be on the same device or different devices, unless expressly specified otherwise.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Non-volatile computer storage media includes removable and non-removable media implemented in any method or technology for storage of information such as computer readable instructions, data structures, program modules or other data. Computer storage media includes, but is not limited to any type of flash memory or other computer accessible memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram illustration of an embodiment 100 showing an example system for anonymous and secure browsing using a remote browsing service.

A user device 102 and a browser 104 may access a remote browsing service 106 across an access barrier 108. The access barrier may be the fact that the user's client device browser 104 may merely display a video stream 112 and capture keyboard, mouse, and other inputs 110 from the browser 104.

A remote browsing service 106 may have a remote browser 114 that may access websites 122 on the internet 120, then render the websites 122. A video capture system 116 may generate the video stream 112 that may be displayed on the user's browser 104. Similarly, the user's keyboard, mouse, and other inputs 110 may be transmitted using a keyboard, mouse and other input mechanism 118 to the remote browser 114.

The access barrier 108 may serve to keep the user device 102 anonymous to the websites 122. This may be achieved because any identifying information collected by the websites 122 may be that of the remote browsing service 106 and not the user device 102. In a typical use scenario, the remote browsing service 106 may be implemented on a virtual machine that may be instantiated for the browsing session. Such an instantiation may involve assigning IP addresses, MAC addresses, and other identifiers with each new virtual machine. In this manner, a website may not be able to associate different browsing sessions from the same user.

Cookies and other stored information that may be stored by websites may be erased with each instantiation of a virtual machine and browser. Such a configuration may further provide an access barrier 108 because tracking data from a particular browsing session may be eliminated with each new instantiation of the virtual machine and browser.

The access barrier 108 may serve to keep the user device 102 secure from the websites 122. The security may come from the fact that any malicious software, such as tracking software, advertisements, viruses, Trojan horses, or other malware may only operate on the remote browsing service. Executable code and data may be prevented from reaching the user device 102 because the only inbound information may be a video stream 112, which may represent the rendered image of the remote browser 114.

A remote browsing administrator 124 may manage the remote browsing service 106, as well as the virtual machines and other instances that may be created and managed for various users. The remote browsing administrator 124 may handle the initial connection with a user device 102, and may perform authentication 126 or other authorization, accounting, and authentication services. Once authenticated, the remote browsing administrator 124 may create a remote browsing instance 128, and assign the remote browsing instance to a user device 102.

The remote browsing administrator 124 may manage several virtual machines, with each virtual machine being assigned to a single user. In some cases, each user may be assigned a browser instance within a virtual machine that may support multiple users. In a typical use case, the remote browsing administrator 124 may have several virtual machines ready to use and configured for users. Such a use case may provide nearly instant connection when a user begins a browsing session.

The remote browsing administrator 124 may manage user preferences, including bookmarks and cookies. In some cases, a user may store bookmarks or cookies for selected websites, and the user may desire to have the bookmarks or cookies preserved for future browsing sessions. The remote browsing administrator 124 may store the bookmarks and cookies for individual users and may populate a new remote browser 114 with the user's bookmarks and cookies with a new browsing session.

A whitelist/blacklist or other Uniform Resource Identifier database 130 may be used to categorize websites into those that may be browsed directly and those that may be browsed securely. Some systems may identify a website as one which a user may be permitted to access directly, and a remote browsing service 106 may redirect the user device 102 to connect directly to the website without going through the remote browsing service 106.

Such a database have a whitelist, where addresses or other descriptors of direct-access websites may be defined. Sometimes, such databases may have a blacklist, where addresses or other descriptors of websites for which anonymous or secure browsing may be identified. In some cases, a service may be accessed to determine whether or not a particular URI may be browsed securely or directly.

Figure 2:
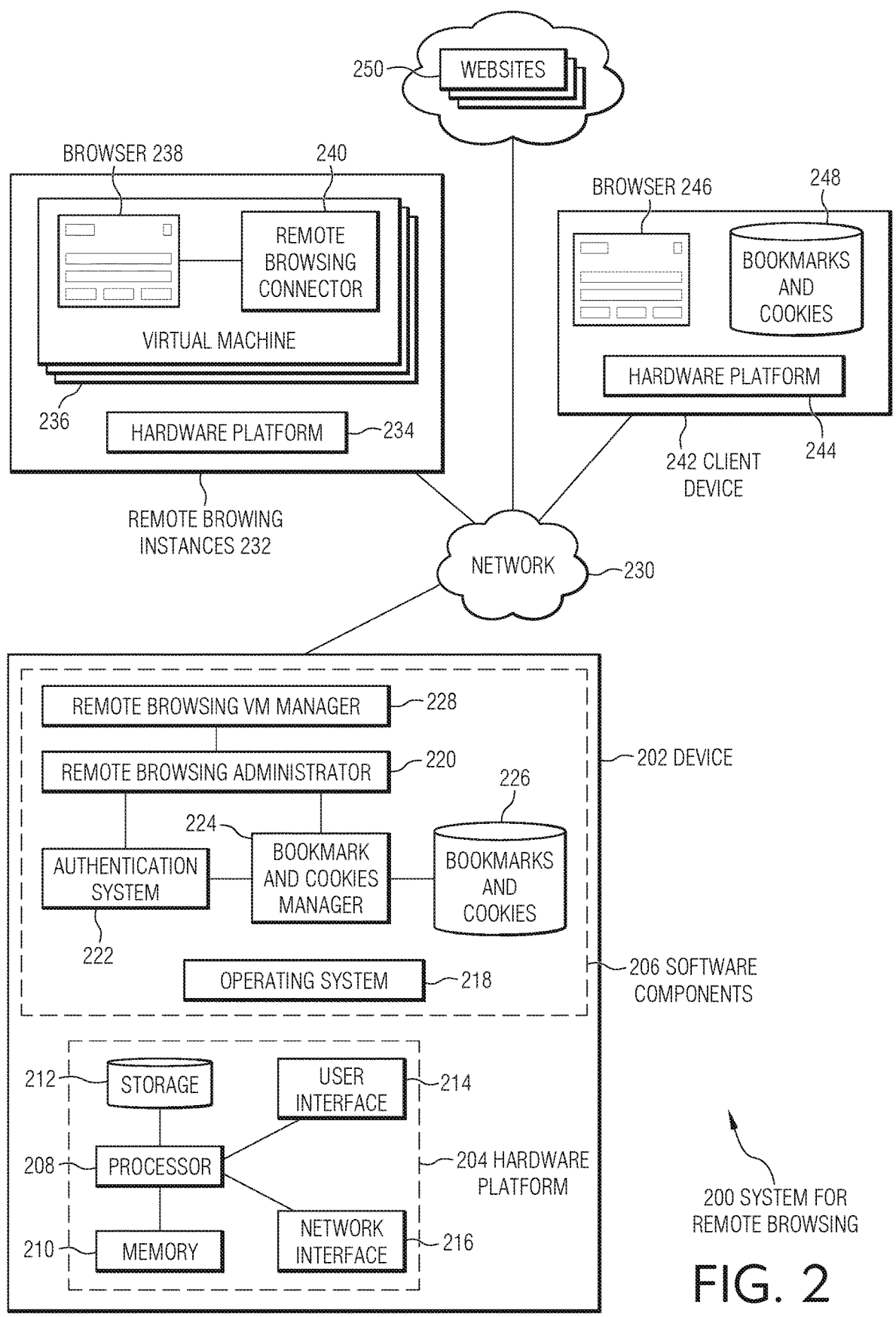
FIG. 2 is a diagram illustration of an embodiment showing a network environment with remote browsing.

FIG. 2 is a diagram of an embodiment 200 showing components that may be used for remote access of an application or system through a browser.

The diagram of FIG. 2 illustrates functional components of a system. In some cases, the component may be a hardware component, a software component, or a combination of hardware and software. Some of the components may be application level software, while other components may be execution environment level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 200 illustrates a device 202 that may have a hardware platform 204 and various software components. The device 202 as illustrated represents a conventional computing device, although other embodiments may have different configurations, architectures, or components.

In many embodiments, the device 202 may be a server computer. In some embodiments, the device 202 may still also be a desktop computer, laptop computer, netbook computer, tablet or slate computer, wireless handset, cellular telephone, game console or any other type of computing device. In some embodiments, the device 202 may be implemented on a cluster of computing devices, which may be a group of physical or virtual machines.

The hardware platform 204 may include a processor 208, random access memory 210, and nonvolatile storage 212. The hardware platform 204 may also include a user interface 214 and network interface 216.

The random access memory 210 may be storage that contains data objects and executable code that can be quickly accessed by the processors 208. In many embodiments, the random access memory 210 may have a high-speed bus connecting the memory 210 to the processors 208.

The nonvolatile storage 212 may be storage that persists after the device 202 is shut down. The nonvolatile storage 212 may be any type of storage device, including hard disk, solid state memory devices, magnetic tape, optical storage, or other type of storage. The nonvolatile storage 212 may be read only or read/write capable. In some embodiments, the nonvolatile storage 212 may be cloud based, network storage, or other storage that may be accessed over a network connection.

The user interface 214 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 216 may be any type of connection to another computer. In many embodiments, the network interface 216 may be a wired Ethernet connection. Other embodiments may include wired or wireless connections over various communication protocols.

The software components 206 may include an operating system 218 on which various software components and services may operate.

A remote browsing administrator 220 may provide the initial contact for an incoming request for remote browsing, as well as to instantiate, configure, and set up the remote browsing session. The remote browsing administrator 220 may have an authentication system 222, which may determine whether an inbound request may be honored, as well as other factors associated with the request.

The authentication system 222 may determine whether a user may have authorization to perform a remote browsing session. The authentication system 222 may verify the user's identity using some type of credential. If a user has paid for the browsing service, any features enabled for the user's subscription may be enabled.

In some use cases, the remote browsing service may be implemented without any authentication. Such a service may be useful for fully anonymous uses, where the remote browsing service may not track any user information.

A user may be authenticated in many different ways. In one way, the user may authenticate by entering a username and password. In another way, a user may be authenticated by accessing a cookie, IP address, MAC address, or other identifier associated with the user's device. Still other ways of authentication may be used.

Some systems may have a bookmark and cookie manager 224, which may access a database of bookmarks and cookies 226. The bookmarks and cookies may be stored from previous user sessions, and the users may have control over which bookmarks and cookies may be stored for later use. In a typical use case, the remote browsing administrator 220 may configure a browsing session with a user's bookmarks and cookies.

A remote browsing virtual machine manager 228 may establish, configure, and manage virtual machines on which a remote browsing connector and remote browser may execute. The remote browsing virtual machine manager 228 may be configured to have several virtual machines running and on standby to service new inbound browsing requests. In other systems, virtual machines may be created, provisioned, and configured on demand.

A set of remote browsing instances 232 may be available over a network 230. The remote browsing instances 232 may operate on a hardware platform 234, and may have one or more virtual machines 236.

Each of the virtual machines 236 may have a remote browser 238 and a remote browsing connector 240. The remote browser 238 may access and render websites 250. The remote browsing connector 240 may take the renderings and create a video stream of the rendered images. The video stream may be transmitted to and displayed in a user's browser, and the user's keyboard, mouse, and other inputs may be captured in the browser and transmitted to the remote browsing connector 240, which may transmit the inputs to the remote browser 238.

A client device 242 may have a hardware platform 244 on which a browser 246 may operate. In a typical use case, a user may access a webpage provided by the remote browsing connector 240. The web page may be a video stream showing the rendered image of the remote browser 238.

A set of bookmarks and cookies 248 may be stored on the client device 242. In some cases, the bookmarks and cookies 248 may be transmitted to a remote browsing administrator 220 or remote browsing connector 240, and may be used to configure the remote browser 238. Some systems may have various mechanisms by which a user may add, remove, and otherwise manage the bookmarks and cookies 248.

Figure 3A:
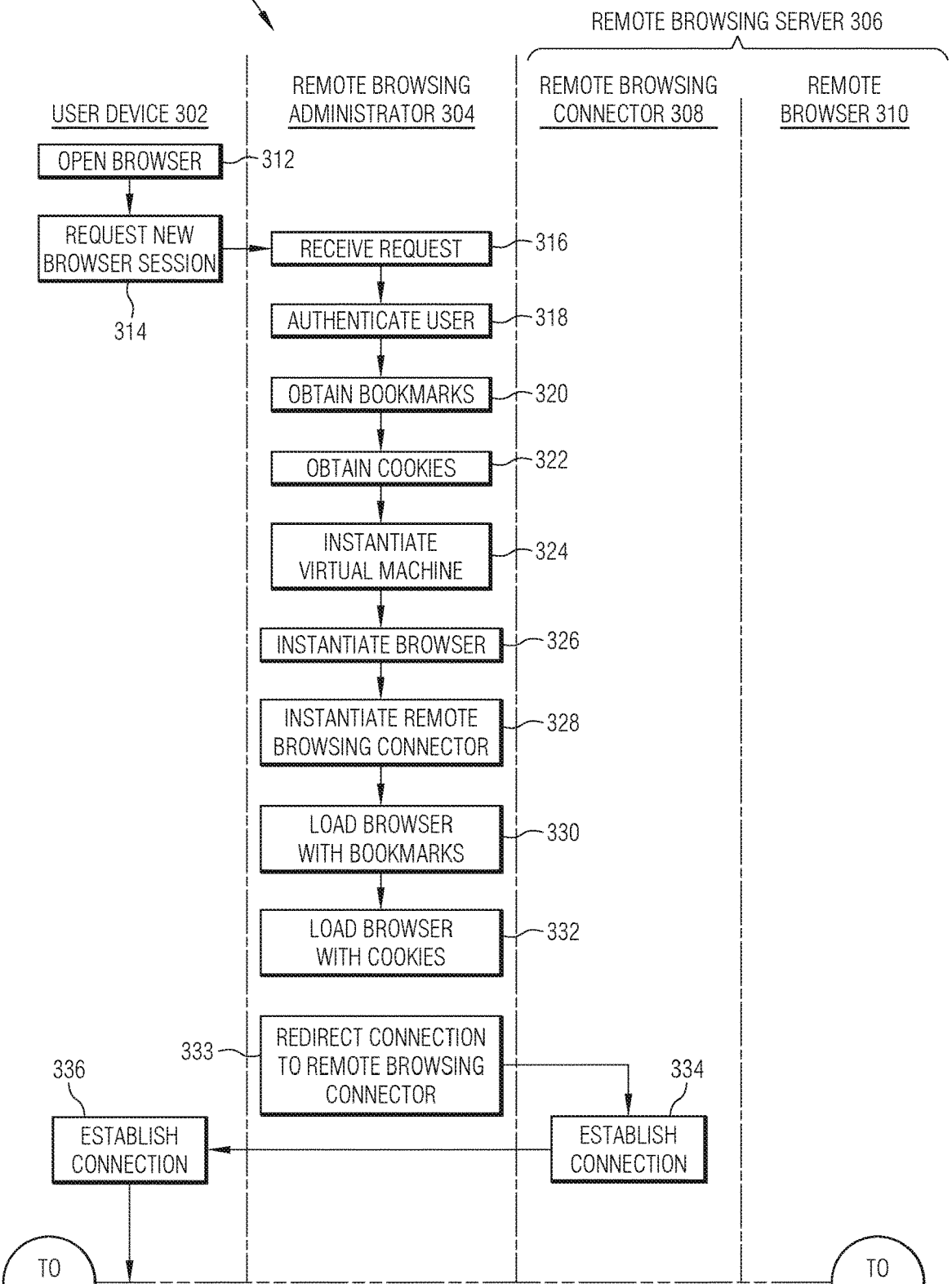
FIGS. 3A and 3B comprise FIG. 3, which is a flowchart illustration of an embodiment showing a method for configuring a remote browsing session.
Figure 3B:
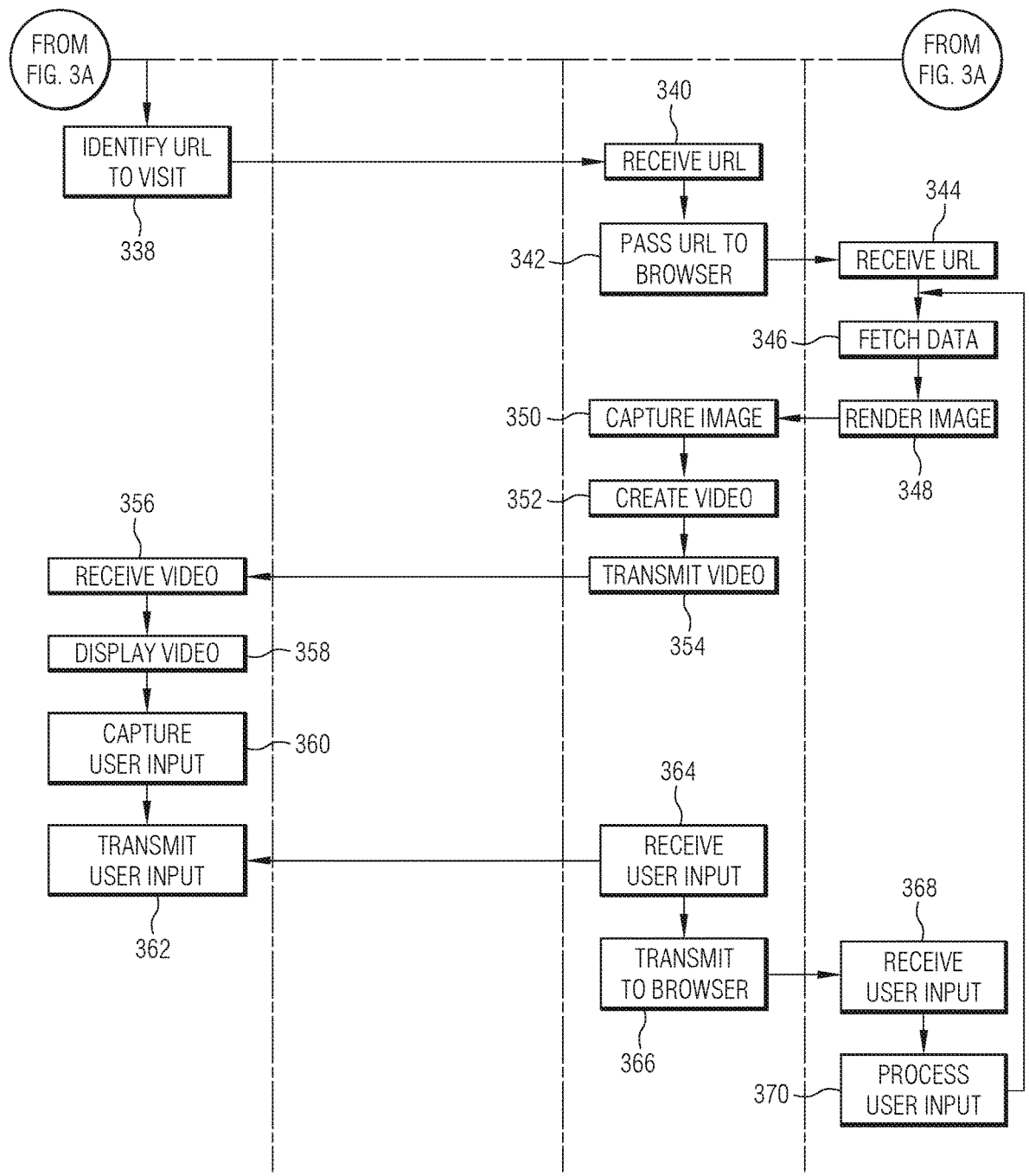

FIG. 3 is a flowchart illustration of an embodiment 300 showing a method of configuring and using a remote browser session. Embodiment 300 is a simplified example of a sequence showing a user device 302 in the left hand column, a remote browsing administrator 304 in the second column, and a remote browsing server 306, consisting of a remote browsing connector 308 in the third column, and a remote browser 310 in the right hand column.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principals of operations in a simplified form.

Embodiment 300 shows one method by which a user device 302 may establish and use a remote browser 310.

The user device 302 may begin when a user opens a browser in block 312 and requests a new browsing session in block 314. One way that such a sequence may be initiated may be to have the user's browser configured to point to the remote browsing administrator as the browser's home page. In many cases, the remote browsing administrator may have a Uniform Resource Identifier to which a user's browser may be configured to connect. In response, the remote browsing administrator 304 may receive the request in block 316.

The remote browsing administrator 304 may authenticate the user in block 318. When authenticated, the user's bookmarks may be obtained in block 320, as well as the user's cookies 322.

The user's bookmarks and cookies may be obtained in several different manners. In one design, the bookmarks and cookies may be stored with the remote browsing administrator 304, such that the user's identifier or credentials may be used to search for and access the bookmarks and cookies. In another design, the bookmarks and cookies may be stored on the user device 302, such that the user device 302 may transfer the bookmarks and cookies to the remote browsing administrator 304.

A virtual machine may be instantiated in block 324, along with a browser in block 326 and a remote browsing connector in block 328. In some cases, a virtual machine may be preconfigured with the browser and remote browsing connector. The browser may be loaded with bookmarks in block 330 and with cookies in block 332.

The connection from the user device 302 may be redirected to the remote browsing connector in block 333, and a connection may be established in blocks 334 and 336 between the remote browsing connector 308 and user device 302, respectively.

The connection between the user device 302 and remote browsing administrator 304 in blocks 334 and 336 may be a webpage that may be served by the remote browsing connector 308. The webpage may include a video stream captured from the remote browser 310 that may be displayed on a browser of the user device 302.

A webpage generated by the remote browsing connector 308 may include executable code that may capture various user inputs from the user device 302 and transmit the user inputs to the remote browsing connector 308. A typical implementation of such executable code may be JavaScript or other browser-executable code.

The executable code may sense and capture mouse movements within a browser window, including mouse movements over the streaming video being displayed in the browser window. The executable code may further sense mouse clicks, click-and-drag, or other mouse operations, then may transmit those operations to the remote browsing connector 308. In many cases, the mouse position on the user's display may be translated to coordinates that may be used by the remote browser 310. For example, a user may be able to shrink, zoom, or otherwise change the streaming video, and therefore mouse positions within the streaming video window will correspondingly change.

When a user device 302 may connect to the remote browsing connector 308, a browser on the user device 302 may be displaying a remote browsing URI provided by the remote browsing connector. The user may browse through different sites and different destination URIs by transmitting a destination URI through the remote browsing connector 308 to the remote browser 310.

A destination Uniform Resource Identifier may be identified to visit in block 338 on the user device 302. The destination Uniform Resource Identifier may be a URI that a user may wish to visit. In some cases, the URI may be typed in directly to a destination window displayed within a browser window of the user device 302. The destination URI may come from a bookmark, which may be a stored URI. In some cases, a user's browser may store bookmarks locally. Sometimes, bookmarks may be known as favorites or have some other designator.

The remote browsing connector 308 may receive the Uniform Resource Identifier in block 340, and may pass the URI to the remote browser 310 in block 342. The remote browser 310 may receive the URI in block 344, fetch the data from the URI in block 346, and render the image in block 348.

The remote browsing connector 308 may capture the image rendered by the remote browser 310 in block 350 and may create a video stream in block 352. The video stream may be transmitted in block 354 to the user device 302, which may receive the video stream in block 356.

The user device 302 may display the video stream in block 358 and may capture user input in block 360. The user input may be transmitted in block 362 to the remote browsing connector 308, which may receive the user input in block 364. The remote browsing connector 308 may transmit the user input to the remote browser 310 in block 366, which may receive the user input in block 368 and process the user input in block 370. The remote browser 310 may transmit some or all of the user input to the webpage being displayed, and may loop back to block 346 to further process any updates to the displayed web page.

The user input of block 362 may be any input that may be gathered from a user device 302. Examples may include mouse inputs, such as location, hover location, right click, left click, center click, click and drag, or other mouse inputs. The mouse inputs may be captured from mouse devices, as well as touchscreens or other pointer devices.

Examples of user input may also include keyboard input, as well as video or audio input that may be captured on the user device 302. In some cases, user input may also include files or other data that may be uploaded to the browser on the user device 302. Some devices may have various other sensors and data collection devices, such as movement detectors, accelerometers, position sensors, as well as temperature sensors, or any other sensing or data collection device associated with the user device 302.

Figure 4:
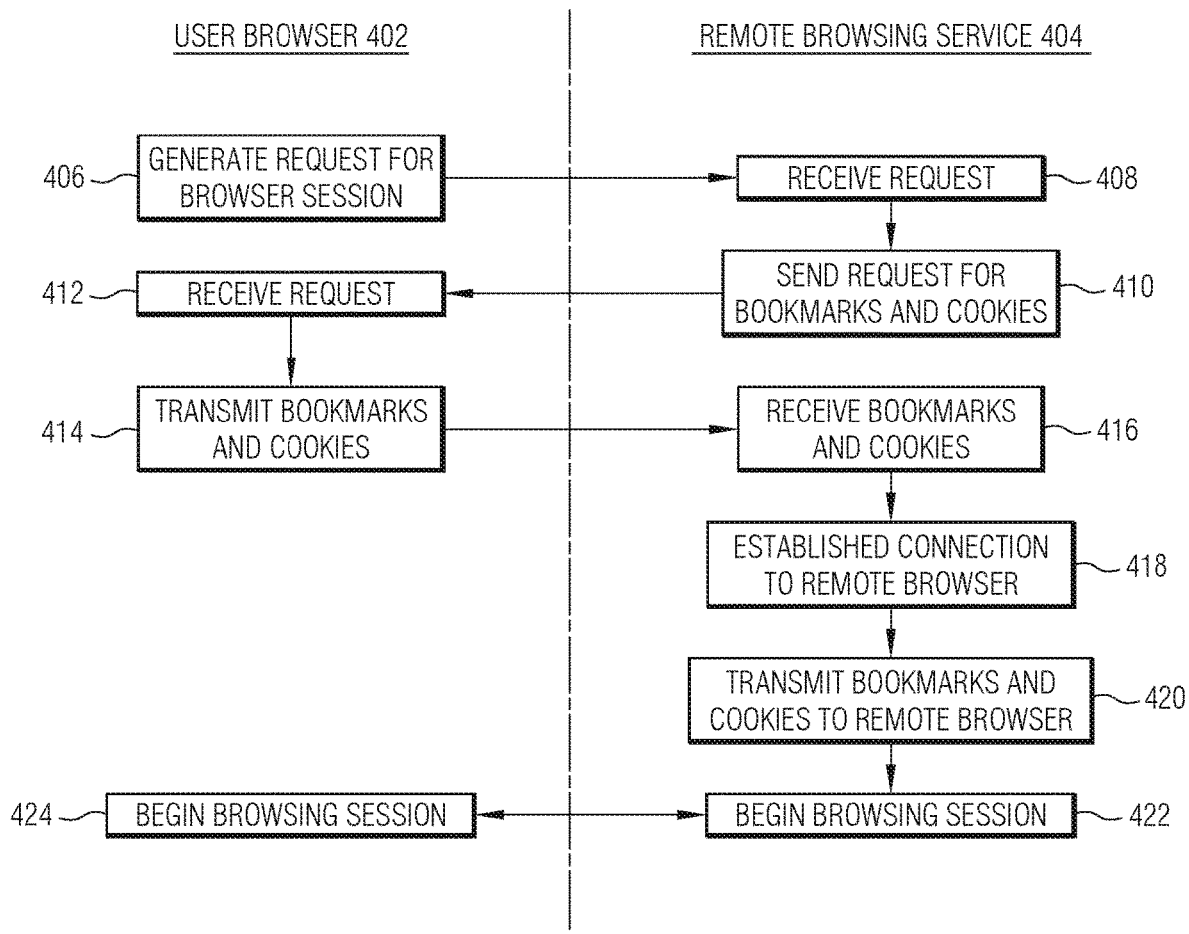
FIG. 4 is a flowchart illustration of an embodiment showing a method for establishing a session with bookmarks stored on a user device.

FIG. 4 is a flowchart illustration of an embodiment 400 showing a method of establishing a session with bookmarks stored on a user device. Embodiment 400 is a simplified example of an embodiment showing the operations of a user browser 402 in the left hand column, and the operations of a remote browsing service 404 in the right hand column. The remote browsing service 404 may represent operations performed by remote browsing administrator, remote browsing server, remote browsing connector, or remote browser, depending on the particular embodiment.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principals of operations in a simplified form.

Embodiment 400 may represent one method by which a user may store and supply bookmarks and cookies, which may be used to configure a remote browser.

A request may be generated in block 406 for a remote browsing session by a user browser 402, while a remote browsing service 404 may receive the request in block 408. The remote browsing service 404 may send a request for bookmarks and cookies in block 410, which may be received by the user browser in block 412. The user browser 402 may transmit the bookmarks and cookies in block 414, which may be received by the remote browsing service 404 in block 416.

A connection may be established in block 418 with a remote browser and bookmarks and cookies may be transmitted to the remote browser in block 420. Now configured, the browsing session may begin in blocks 422 and 424 between the remote browsing service 404 and the user browser 402.

Figure 5:
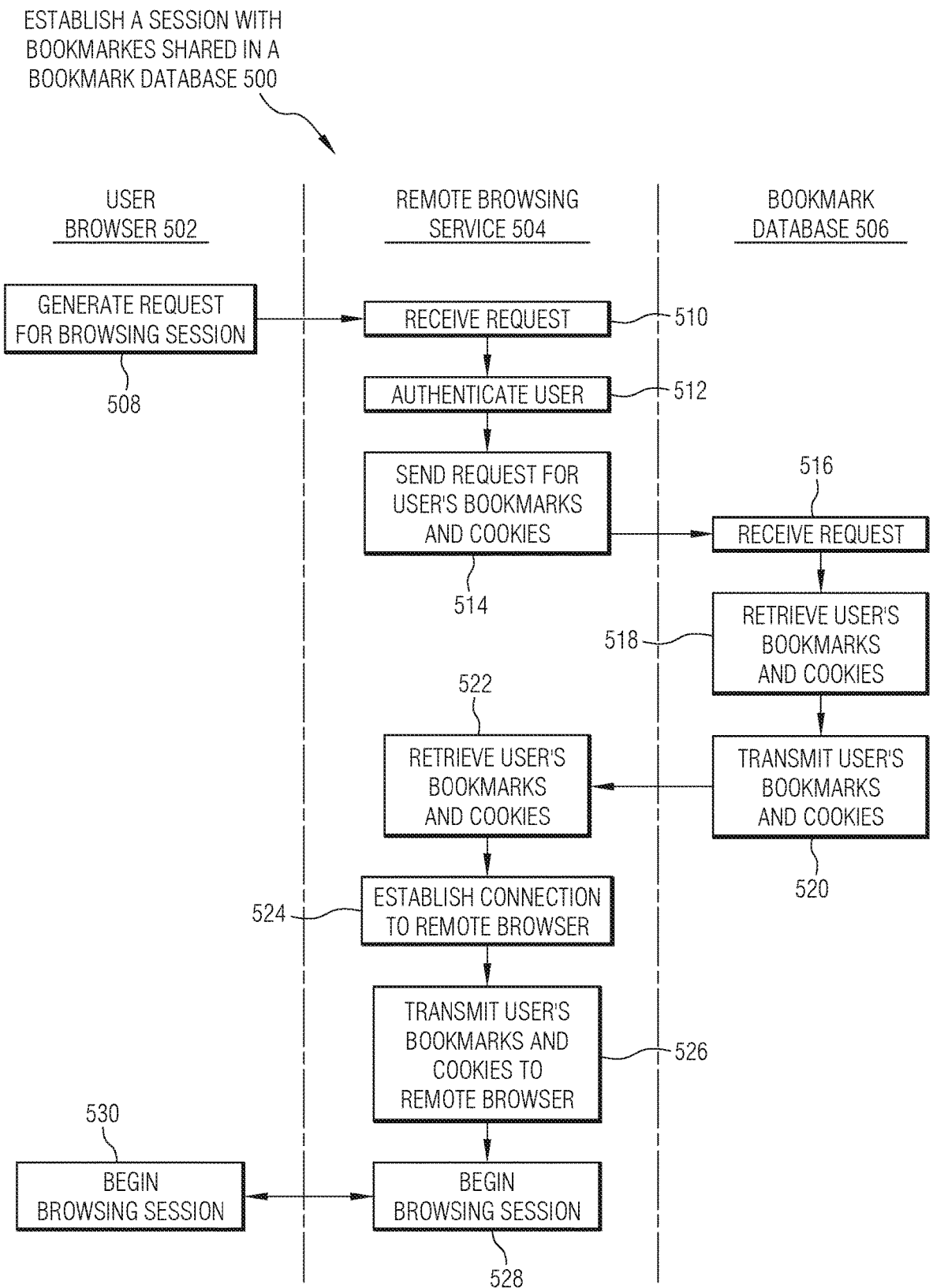
FIG. 5 is a diagram illustration of an embodiment showing a method for establishing a session with bookmarks stored in a bookmark database.

FIG. 5 is a flowchart illustration of an embodiment 500 showing a method of establishing a session with bookmarks stored on a bookmark database. Embodiment 500 is a simplified example of an embodiment showing the operations of a user browser 502 in the left hand column, and the operations of a remote browsing service 504 in the center column, and the operations a bookmark database 506 in the right hand column. The remote browsing service 504 may represent operations performed by remote browsing administrator, remote browsing server, remote browsing connector, or remote browser, depending on the particular embodiment.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principals of operations in a simplified form.

Embodiment 500 may represent one method by which a remote browsing service may retrieve bookmarks, cookies, and other configuration information for a user's browser session. In many cases, these data may configure a remote browser for the specific user's preferences. In an example of a system used in an enterprise or large company, the company-wide set of bookmarks and cookies may be used to configure a browser used by employees of the company. Such a customization of the browser may be the same or similar to multiple employees, while other customizations may be different on a person-to-person basis or even a session-by-session basis.

A request may be generated in block 508 for a browsing session by the user browser 502, which may be received by the remote browsing service 504 in block 510. The user may be authenticated in block 512, then the remote browsing service 504 may send a request in block 514 to the bookmark database 506 for the bookmarks.

The bookmark database 506 may receive a request in block 516, retrieve a user's bookmarks, cookies, and other customization information in block 518, and transmit the information in block 520 to the remote browsing service 504.

The user's bookmarks, cookies, and other customization information may be received in block 522 by the remote browsing service 504, then may establish a connection to a remote browser in block 524 and transmit the bookmarks, cookies, and other customization information to the browser in block 526. The user browser 502 and remote browsing service 504 may begin a browsing session in blocks 530 and 528, respectively.

Figure 6A:
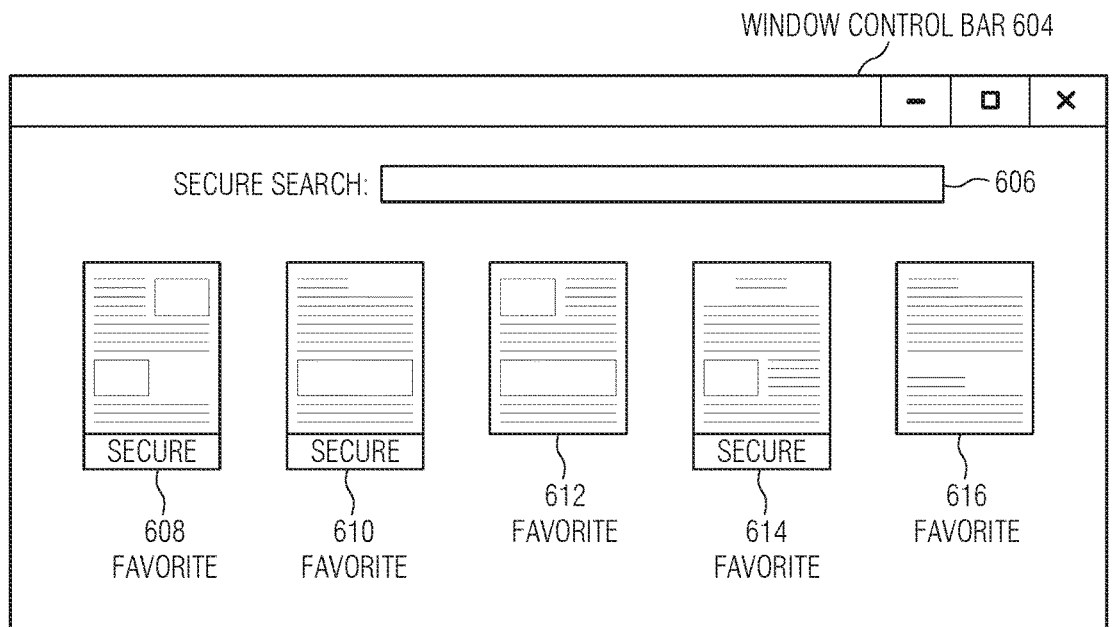
FIGS. 6A and 6B are diagram illustrations of browser windows for secure remote browsing, as well as options for managing the secure remote browsing.
Figure 6B:
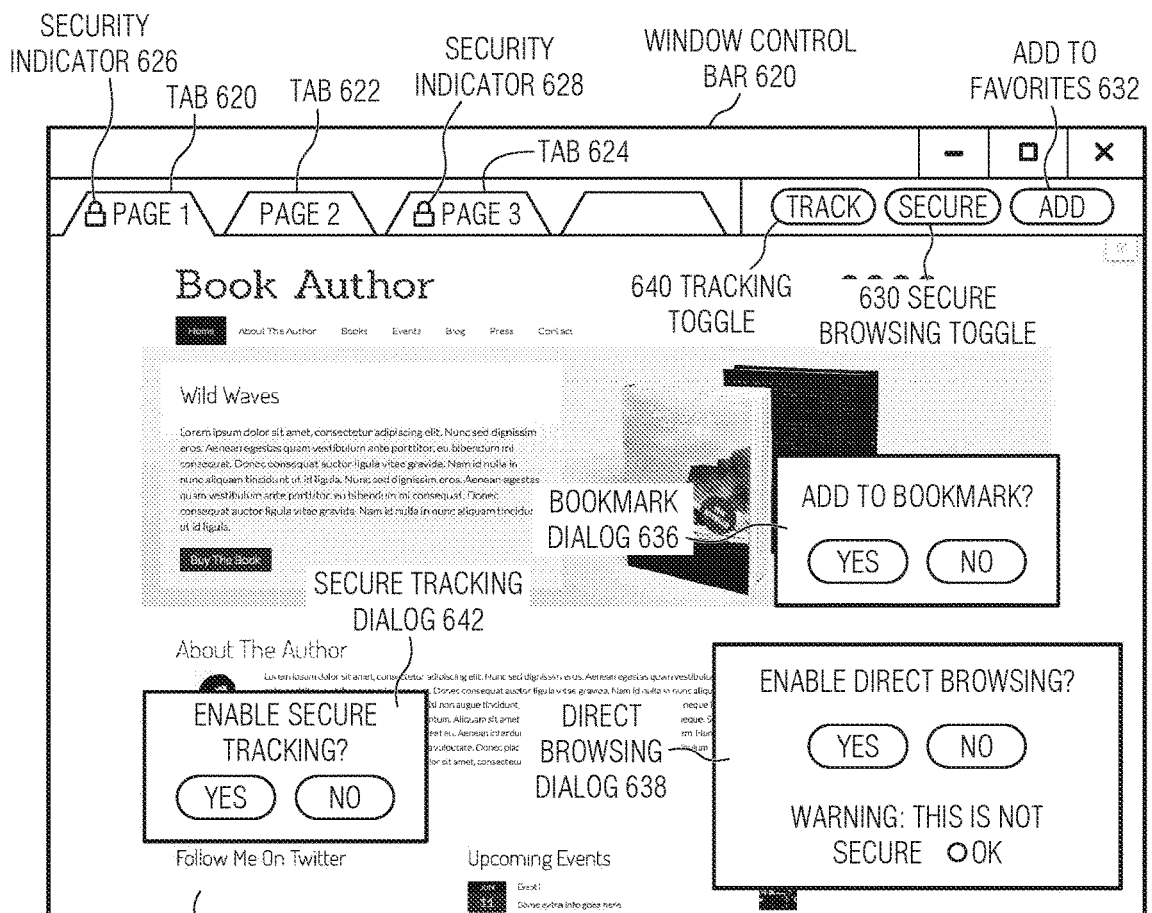

FIGS. 6A and 6B are diagram illustrations of embodiments showing a web user interface on a user's browser window. FIG. 6A may illustrate a starting screen that may displayed at the beginning of a browsing session, and FIG. 6B may illustrate a screen with various dialog boxes that may occur when a user performs various functions.

FIG. 6A may illustrate a starting screen that may be provided by a remote browsing service when a user may begin a browsing session. In one use case, a user's browser may be configured to point to a remote browsing service as a home page, such that the user's first interaction begins with the remote browsing service.

The home page illustrated in FIG. 6A may be reached by starting a browser, which may point to a remote browsing manager, which may authenticate the user, instantiate a virtual machine with a remote browser, and begin a remote browsing session.

The image displayed in the browser window 602 may be a streaming video image generated by the remote browser. The user interactions with the browser window 602 may be captured and transmitted back to the remote browser. From the user's perspective, the browsing experience is similar to, and sometimes indistinguishable from, browsing directly to a particular website. The browser window 602 may have a window control bar 604, which may be typical of various operating systems with a graphical user interface.

The opening browser window 602 may contain a search bar 606, as well as several favorites 608, 610, 612, 614, and 616. The search bar 606 may be the initial navigation bar that may send queries to a search engine, which may cause the search results to be rendered and displayed in the browser window. Because of the remote browsing service, the search query may be generated from the remote browser, and not the user's device. Therefore, the search engine may not be able to trace a user's search queries back to a specific user.

The various favorites may be bookmarks or other data used to configure the remote browser for the user. In some cases, the favorites may have a graphical indicator that some of the favorites, such as favorites 608, 610, and 614 may be browed securely. The other favorites may be browsed without going through the remote browsing service. Such a method may be known as "directly browsing" a website, meaning that there may not be an intermediate server that renders a video stream of the website between the user's browser and the website.

The browser window 602 may be active such that a user may be able to place a cursor over the search box 606 and type in a search term, or that a user may be able to click on one of the favorites to navigate to the respective website. In the case of favorites that may not be listed as "secure", a click on the favorites 612 and 616 may open a direct connection from the user's browser to that website.

FIG. 6B may illustrate a browser window during a browsing session. The browser window 618 may have a window control bar 620, which may interact with the user's operating system to manipulate the browser window 618.

Various tabs 620, 622, and 624 may show different web pages within the browsing session. The security indicators 626 and 628 may indicate that tabs 620 and 624 may be displaying content from the remote browser service, while tab 622 that does not have a security indicator may be displaying directly-connected content.

As a user may be browsing a web page, several options may be available to the user. In the example of FIG. 6B, the user may have a secure browsing toggle 630, an add to favorites button 632, as well as a tracking toggle 630.

The secure browsing toggle 630 may be used to turn on and off whether the current web page can be browsed directly or through the remote browsing service. When a user may select the toggle, a dialog box may be displayed, such as the direct dialog box 638. When a user may select "Yes" and check the box acknowledging that browsing the website directly is not secure, the website may be added to a white list, which may permit the user to directly browse to the website.

When a user selects the secure browsing toggle 630 while browsing a non-secure or direct browsing session, the web page may be placed on a black list or otherwise defined so that the future browsing sessions to the website may be performed securely through the remote browsing service.

The add to favorites button 632 may cause the website being displayed to be added to a list of favorites or be bookmarked for that user. A bookmark dialog 636 may be presented to the user to confirm their selection.

The tracking toggle 630 may cause any cookies for the website to be toggled on or off. When turned on, the browser may allow the website to place cookies or other data on the browser, and the cookies may be stored for future use in subsequent browsing sessions. A secure tracking dialog box 642 may be presented to the user to confirm their selection.

Figure 7:
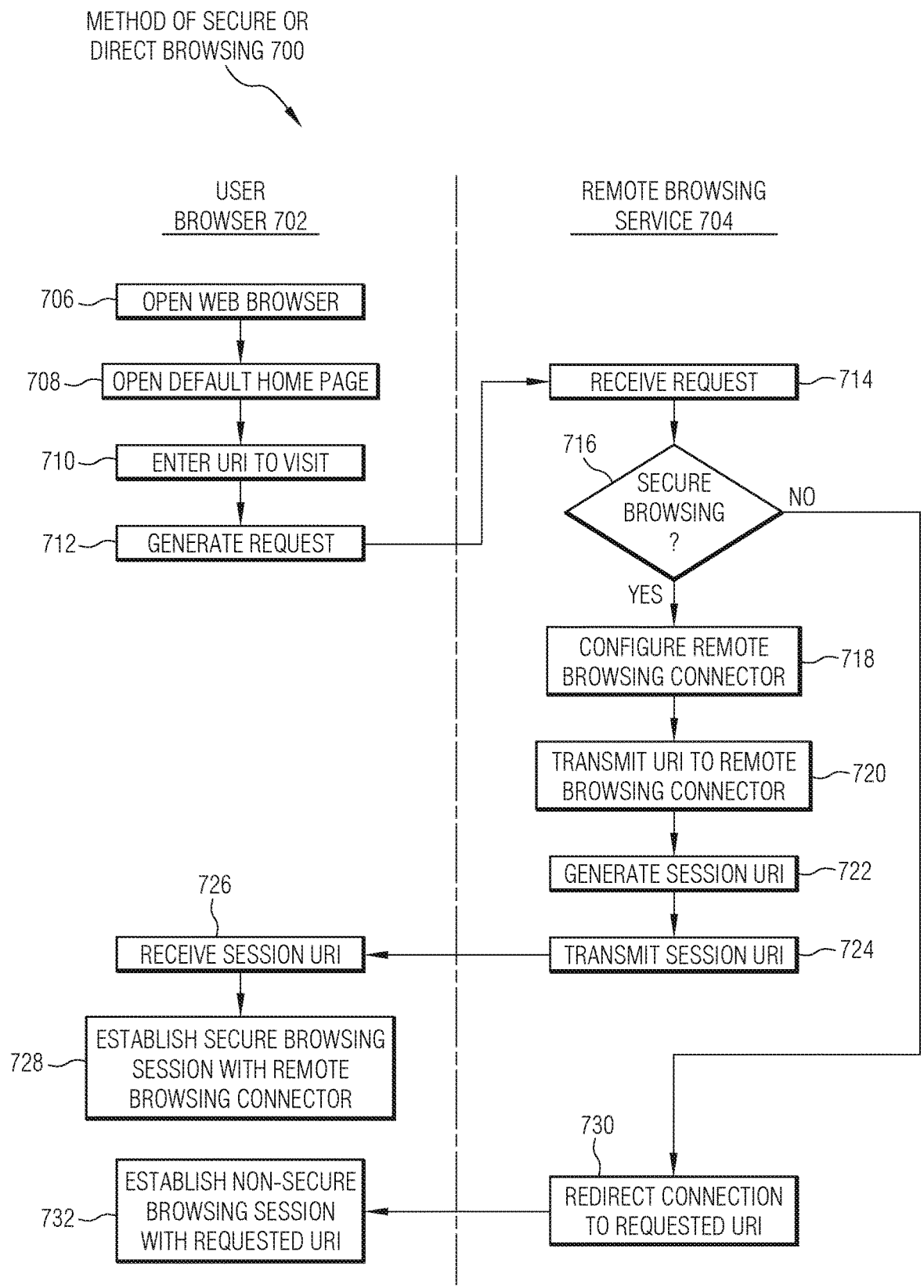
FIG. 7 is a flowchart illustration of an embodiment showing a method of managing both secure and direct browsing.

FIG. 7 is a flowchart illustration of an embodiment 700 showing a method for secure or direct browsing for a particular website. Embodiment 700 is a simplified example of an embodiment showing the operations of a user browser 702 in the left hand column, and the operations of a remote browsing service 704 in the right hand column. The remote browsing service 704 may represent operations performed by proxy, remote browsing administrator, remote browsing server, remote browsing connector, or remote browser, depending on the particular embodiment.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principals of operations in a simplified form.

Embodiment 700 may illustrate a method for direct browsing or secure browsing for a particular Universal Resource Identifier or webpage. When the webpage is approved for direct browsing, the user's browser may be directly connected to the webpage, but when the webpage may not be approved for direct browsing, the webpage may be viewed through a remote browsing service.

The decision as to whether to display a webpage directly or through a remote browsing service may be made through many different mechanisms. One mechanism may be a white list, where only websites listed in the white list may be visited directly. Another mechanism may be a black list, where only websites listed in the black list are viewed securely. Some systems may combine both white and black lists, while other systems may have still other mechanisms.

The decision may be made by any device within the chain from the user device to the remote browsing service. In some cases, a proxy device may be placed between the user device and the remote browsing service. An example of such a proxy device may be a network access point, router, or other piece of network equipment that may be able to inspect and route information.

In some cases, the proxy decisions may be made by a user device. One example of an implementation may be to have a plug in or other executable code embedded in a web browser. Another example, may be to have executable code as part of a network connection that may intercept and route traffic before the request leaves the device.

In still other cases, a remote browsing service may make the decisions as to whether a website is directly accessible by a user device. Such a situation is described in embodiment 700.

A user browser 702 may open the web browser in block 706 and open a default home page in block 708. A user may enter a Uniform Resource Identifier or web address in block 710, and the request may be generated in block 712.

A remote browsing service 704 may receive the request in block 714 and determine whether the website will be browsed using secure browsing in block 716.

When the website is to be browsed in a secure manner in block 716, the remote browsing service 704 may configure a remote browsing connector in block 718, transmit the URI to the remote browsing connector in block 720, and generate a session URI in block 722.

The session URI may be a web address for the remote browsing connector and may contain the streaming video of a remote browser, as well as JavaScript or other mechanism to collect user input from keyboard, mouse, or other input devices. The session URI may be transmitted in block 724 to the user browser 702, which may receive the session URI in block 726 and establish a secure browsing session in block 728.

If the URI is to be viewed directly in block 716 or in a non-secure manner, the remote browsing service 704 may redirect the connection to the requested URI in block 730, and the user browser 702 may establish a non-secure browsing session with the requested URI in block 732.

Figure 8:
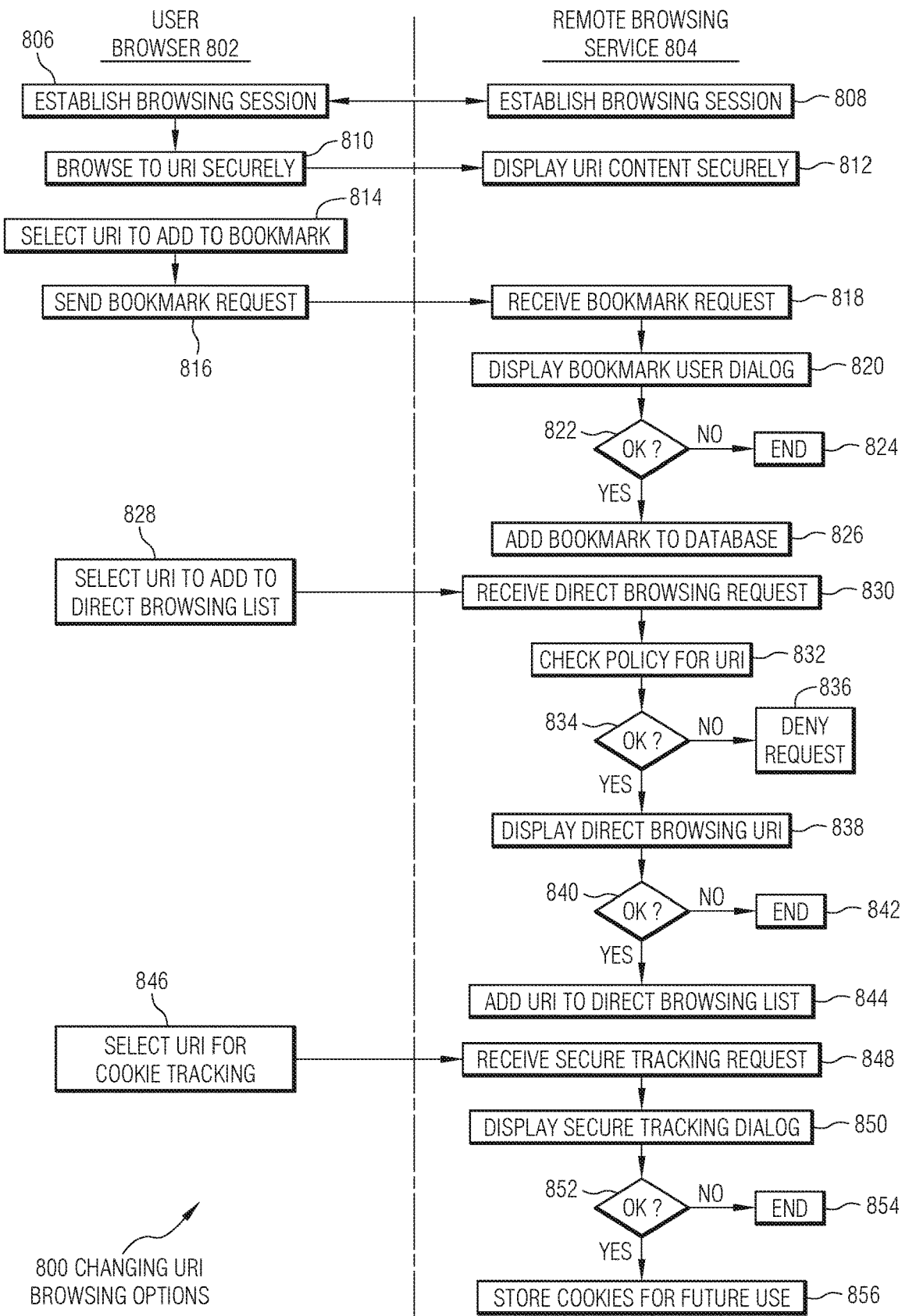
FIG. 8 is a flowchart illustration of an embodiment showing a method of managing configuration options for secure browsing.

FIG. 8 is a flowchart illustration of an embodiment 800 showing various methods for managing browsing options. Embodiment 800 is a simplified example of an embodiment showing the operations of a user browser 802 in the left hand column, and the operations of a remote browsing service 804 in the right hand column. The remote browsing service 804 may represent operations performed by proxy, remote browsing administrator, remote browsing server, remote browsing connector, or remote browser, depending on the particular embodiment.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principals of operations in a simplified form.

Embodiment 800 may illustrate several different ways that a user may manage their browsing options for various URIs, such as managing whether the URI is browsed securely or directly, whether to add the URI as a bookmark, and whether tracking information may be stored for the URI.

In blocks 806 and 808, a user browser 802 may establish a browsing session with a remote browsing service 804. A user may browse to a URI in a secure mode in block 810, which may be transmitted to the remote browsing service 804 for secure display in block 812.

A user may select the URI to add to bookmarks in block 814. A bookmark request may be sent in block 816 to the remote browsing service 804, which may receive the request in block 818. The remote browsing service 804 may display a bookmark user dialog in the video stream to the user browser 802 in block 820 and may receive confirmation in block 822. If the user declines to add the bookmark in block 822, the sequence may end in block 824. If the user affirms their selection in block 822, the bookmark may be added to a database in block 826.

In many cases, the bookmark database may be part of the remote browsing service 804. In other cases, the bookmark database may be stored on the user device.

A user browser 802 may select a URI to add to a direct browsing list in block 828. Such a selection may add the URI to a white list as described above. The request may be received in block 830 by the remote browsing service 804 and the request may be evaluating against a policy in block 832. In some cases, a specific set of policies may be defined for which websites may be allowed for direct access and which may be allowed for secure browsing. If the URI is denied in policy grounds in block 834, the request may be denied in block 836.

When the URI is allowed on policy grounds in block 834, a dialog box may be presented to the user in block 838, and after confirmation in block 840, the URI may be added to a direct browsing list in block 844. If the user fails to affirm their selection in block 840, the process may end in block 842.

A user may select a URI for cookie tracking in block 846, which may generate a request that may be received by a remote browsing service 804 in block 848. A secure tracking dialog box may be presented in block 850, and when the user affirms the selection in block 852, any cookies related to the website may be stored for future use in block 856. If the user fails to affirm their selection in block 852, the process may end in block 854.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

To the extent that the appended claims have been drafted without multiple dependencies, this has been done only to accommodate formal requirements in jurisdictions which do not allow such multiple dependencies. It should be noted that all possible combinations of features which would be implied by rendering the claims multiply dependent are explicitly envisaged and should be considered part of the invention.

What is claimed is:

1. A computing apparatus that operates as a remote browsing service, the computing apparatus comprising:
   a processor; and
   a memory storing instructions that, when executed by the processor, configure the apparatus to:
   establish a first connection to a first browser on a user device;
   receive a destination Uniform Resource Identifier;
   pass said destination Uniform Resource Identifier to a locally running browser;
   capture a video from rendered images on said locally running browser;
   transmit said video to said first browser on said user device;
   receive user input from said user device, said user input being captured by said first browser; and
   transmit said user input to said locally running browser.

2. The computing apparatus of claim 1 wherein the instructions further configure the apparatus to:
   create a webpage comprising said video stream, said webpage having a remote browsing Uniform Resource Identifier.

3. The computing apparatus of claim 2, said first connection being from said first browser to said remote browsing Uniform Resource Identifier.

4. The computing apparatus of claim 2, said webpage wherein the instructions further configure the apparatus to executable code that captures said user input.

5. The computing apparatus of claim 4, said executable code being browser-executable code.

6. The computing apparatus of claim 1 wherein the instructions further configure the apparatus to:
   instantiating said locally running browser.

7. The computing apparatus of claim 6 wherein the instructions further configure the apparatus to:
   said locally running browser being instantiated with no cached data.

8. The computing apparatus of claim 6 wherein the instructions further configure the apparatus to:
   determine a bookmark; and
   add said bookmark to said locally running browser.

9. The computing apparatus of claim 6 wherein the instructions further configure the apparatus to:
   determine a cookie; and
   add said cookie to said locally running browser.

10. The computing apparatus of claim 1 wherein the instructions further configure the apparatus to:
    receive voice input from said user device; and
    transmit said voice input to said locally running browser.

11. The computing apparatus of claim 1 wherein the instructions further configure the apparatus to:
    receive video input from said user device; and
    transmit said video input to said locally running browser.

12. The computing apparatus of claim 1 wherein the instructions further configure the apparatus to:
    receive a file download from said user device; and
    transmit said file download to said locally running browser.

13. The computing apparatus of claim 1 wherein the instructions further configure the apparatus to:
    receive a bookmark request from said user device for a second Uniform Resource Identifier; and
    store said second Uniform Resource Identifier.

14. The computing apparatus of claim 13 wherein the instructions further configure the apparatus to:
    transmit said second Uniform Resource Identifier to said user device.

15. The computing apparatus of claim 13 wherein the instructions further configure the apparatus to:
    store said second Uniform Resource Identifier in a bookmark database.

16. The computing apparatus of claim 1 wherein the instructions further configure the apparatus to:
    determine that said destination Uniform Resource Identifier is to be browsed securely.

17. The computing apparatus of claim 16 wherein the instructions further configure the apparatus to:
    check said destination Uniform Resource Identifier against a Uniform Resource Identifier database to determine that said destination Uniform Resource Identifier is to be browsed securely.

18. The computing apparatus of claim 17, said Uniform Resource Identifier database comprising a white list.

19. The computing apparatus of claim 17, said Uniform Resource Identifier database comprising a black list.

20. The computing apparatus of claim 1 wherein the instructions further configure the apparatus to:
    receive a second destination Uniform Resource Identifier;
    determine that said second destination Uniform Resource Identifier is to be browsed directly; and
    redirect said first browser to connect to said second destination Uniform Resource Identifier.

* * * * *